Sept. 28, 1943.  C. M. BIGGS  2,330,668
SAFETY MECHANISM FOR GLASS FORMING MACHINES
Filed Sept. 13, 1939  3 Sheets-Sheet 1

Inventor
Charles M. Biggs
By
Eckstein + Eckstein
Attorneys

Sept. 28, 1943.  C. M. BIGGS  2,330,668
SAFETY MECHANISM FOR GLASS FORMING MACHINES
Filed Sept. 13, 1939  3 Sheets-Sheet 2
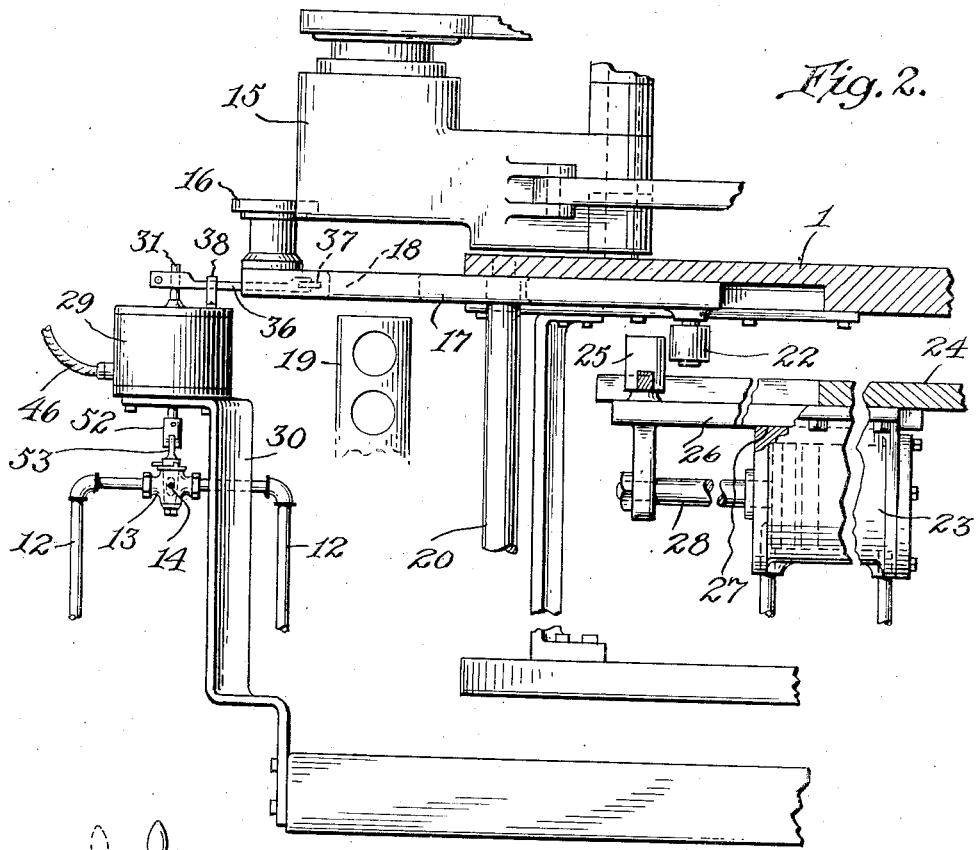
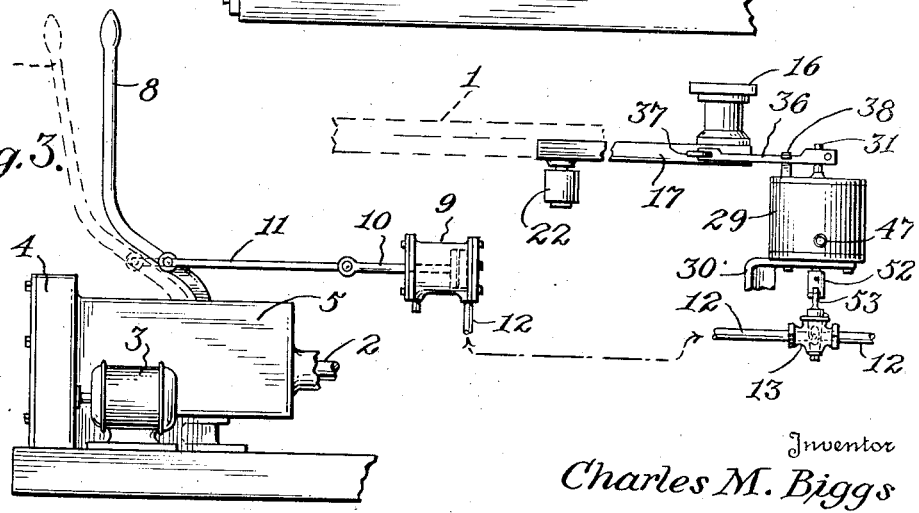
Inventor
Charles M. Biggs
By
Eckleston & Eckleston
Attorneys Sept. 28, 1943.                    C. M. BIGGS                    2,330,668
                    SAFETY MECHANISM FOR GLASS FORMING MACHINES
                    Filed Sept. 13, 1939          3 Sheets-Sheet 3
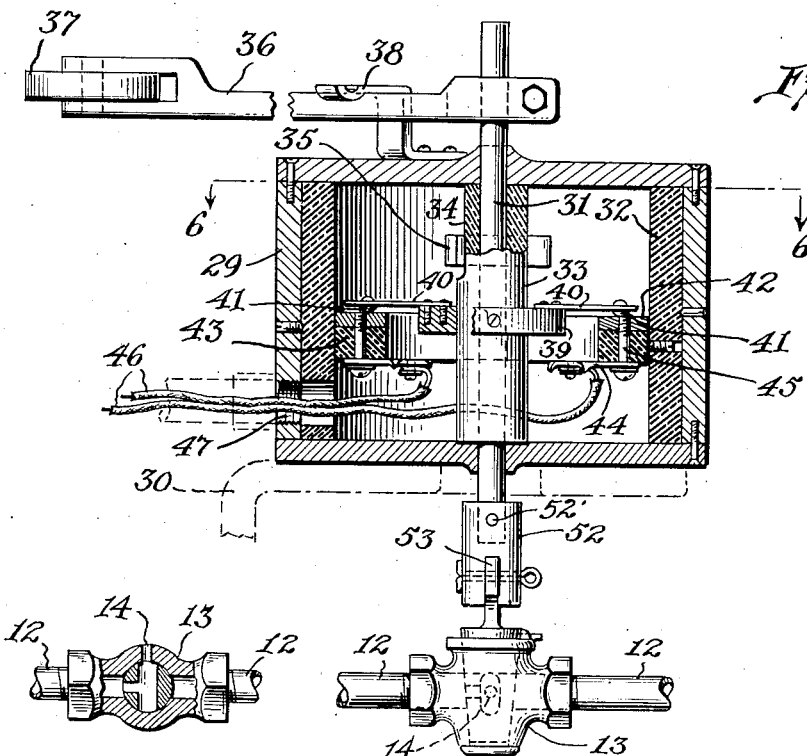
Fig. 4.
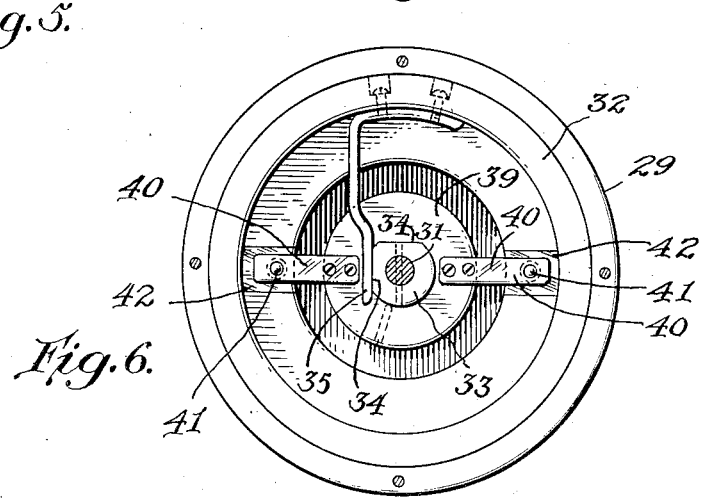
Fig. 5.
Fig. 6.
Inventor
Charles M. Biggs
By
Eccleston + Eccleston
Attorneys Patented Sept. 28, 1943

2,330,668

UNITED STATES PATENT OFFICE 2,330,668

SAFETY MECHANISM FOR GLASS FORMING MACHINES

Charles M. Biggs, Lancaster, N. Y., assignor to Hazel-Atlas Glass Company, Wheeling, W. Va., a corporation of West Virginia Application September 13, 1939, Serial No. 294,737

10 Claims. (Cl. 49—37)

The invention relates to machines for forming glass containers and other glass articles, and particularly to mechanism for preventing damage to the machine in the event certain parts of the machine do not operate in the intended manner.

The invention is particularly adapted to use with glass forming machines in which a slide carries a mold bottom into position to cooperate with the blow mold, and one of the objects of the invention is to provide mechanism by which the operation of the machine will be instantly stopped, if it should happen that for any reason one of the mold bottoms is not moved to its proper position.

Various other objects and advantages of the invention will be apparent to those skilled in the art, from the following detailed description, when taken in connection with the accompanying drawings, in which, Figure 1 is a plan view of the apparatus, largely diagrammatic.

Figure 2 is a vertical sectional view taken on line 2—2 of Figure 1, parts being shown in elevation.

Figure 3 is an elevational view of the rotary control switch and associated parts, and the clutch operating mechanism.

Figure 4 is a vertical sectional view of the rotary control switch, with the associated parts shown in elevation.

Figure 5 is a horizontal sectional view of the air cock which is automatically operated to throw out the clutch; and Figure 6 is a horizontal sectional view of the rotary control switch, taken on line 6—6 of Figure 4.

Figure 1:
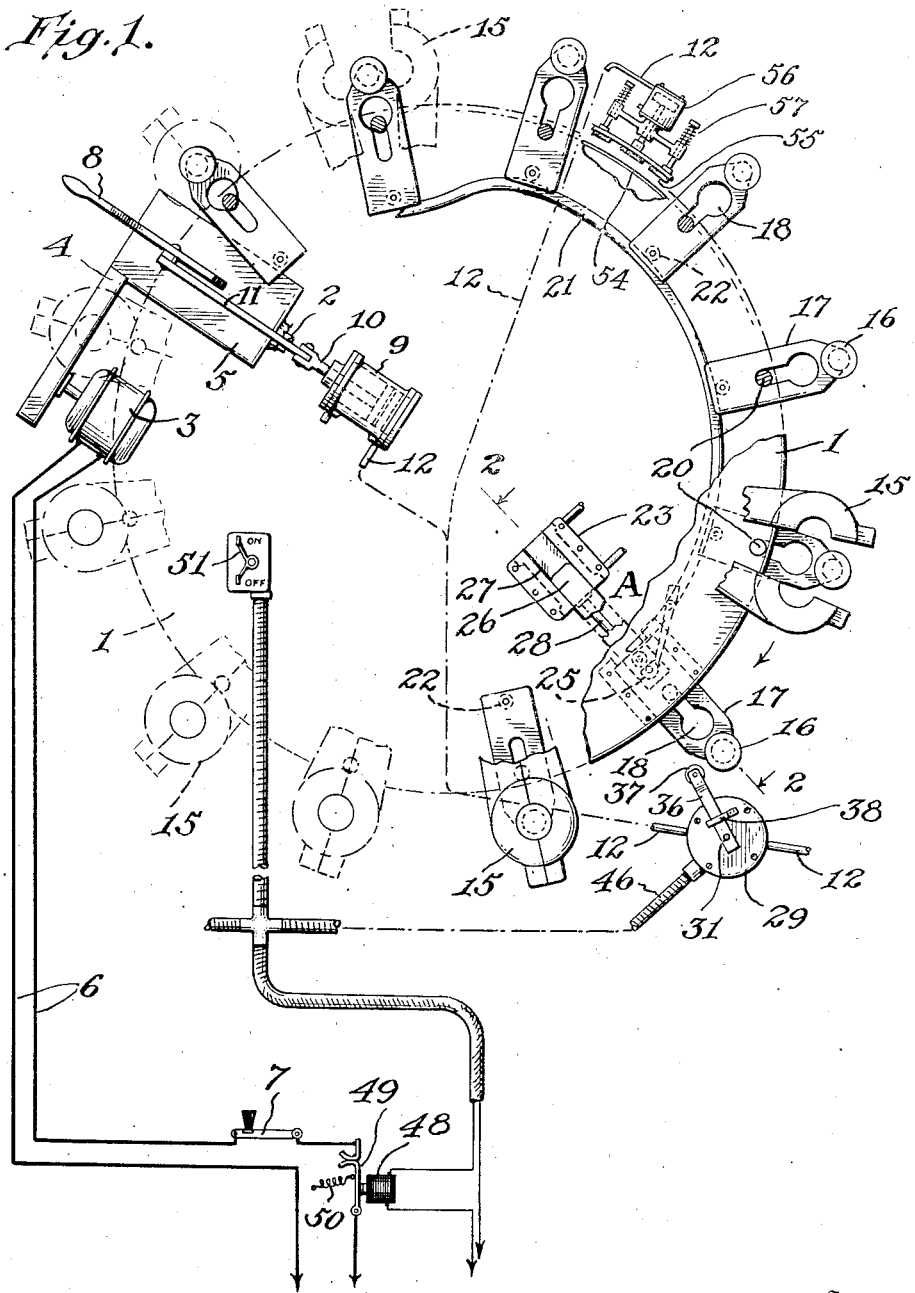

The invention is not limited to a forming machine of a specific construction, and it is unnecessary to illustrate any complete forming machine. However, in order that the invention may be clearly understood I have shown certain parts of a well known forming machine in which an intermittently rotated table carries a plurality of neck rings, parison molds, blow molds, and blow mold bottoms. In this well known type of machine, the parison mold is elevated into cooperative position with the neck ring, the glass parison is then formed, and the parison mold is then lowered out of the way and the blow mold bottom is moved into position and the blow mold closed, whereupon the glass parison is blown to the desired form.

This type of machine is so well known that it is illustrated only in a general way. The mold table is referred to by numeral 1, and this table is rotated by a shaft 2. The shaft gives a step-by-step rotary movement to the table, through a Geneva driving mechanism, which is commonly employed with glass forming machines, and shown in patents such as Stenhouse 1,601,836, October 5, 1926, and Algeo et al. 1,911,870, May 30, 1933. The shaft 2 is continuously rotated by a motor 3, through a reduction gear box 4, and the usual clutch, housed in the clutch case 5, is provided in the driving mechanism. Numeral 6 refers to the main power lines leading to the motor 3, and numeral 7 refers to the main switch in this line.

The clutch housed in the clutch case 5 in the driving mechanism for the rotary mold table, is provided with an operating lever 8. When the lever is in the position shown in full lines in Figure 3, the clutch is "in," and it is thrown "out" by moving the lever to the dotted line position. The clutch is preferably moved to "in" position by hand, but an air cylinder 9 is provided for throwing the clutch "out." The piston rod 10 of the cylinder 9 is operatively connected to the lever 8 by means of a link 11. An air line 12, from any desired source of compressed air, leads to the rear end of the cylinder, and an air cock 13 is provided in this air line, as best shown in Figures 2, 3, 4 and 5. When the valve is in its normal position, as shown in Figure 5, compressed air from the source of supply is shut off, and the rear end of the clutch cylinder 9 is in communication with the atmosphere, through vent 14. The clutch is now "in," having been thrown to "in" position by the hand operation of clutch lever 8.

When the clutch is to be thrown out the valve 13 is rotated thus shutting off the vent 14, and opening communication between the source of compressed air and the rear end of the clutch cylinder 9. The lever 8 is thereby moved to dotted line position, Figure 3, to throw out the clutch. The mechanism for automatically operating the cock 13, to throw out the clutch, will be described hereinafter.

The mold table 1 is, as usual, provided with a plurality of mold units and associated parts. These mold units include neck rings, parison molds, blow molds, and slides carrying the blow mold bottoms. All of these parts are old and well known and therefore are not illustrated, but are shown in the above-mentioned Stenhouse and Algeo et al. patents. The drawings do show however the blow mold bottom slides carrying the mold bottoms, and the blow molds are illustrated more or less diagrammatically.

The blow molds are indicated by numeral 15, and the blow mold bottoms are referred to by numeral 16; these bottoms being mounted on slides 17, as is the usual construction. The slides are intermittently moved in and out. When the slides are in their outward position openings 18 in the slides permit the parison molds to be moved upwardly and downwardly, into and out of cooperative relation with the neck rings. This is the ordinary construction of machines of this type, and a carrier or cage for the parison mold is shown at 19. The outward movement of the mold bottom slides is limited by rods 20.

The slides are moved outwardly by a cam, and inwardly by a cylinder. The cam for moving the slides outwardly is referred to by numeral 21. After the formation of the container or other glass article has been completed, the blow mold is opened to permit removal of the article, and upon further rotary movement of the mold table the roller 22 on the bottom of the slide 17 engages the cam 21 and is thereby moved outwardly as shown in the upper part of Figure 1. The parison mold is now raised into cooperative relation with the neck ring, and the parison is then formed, and thereafter the parison mold is lowered, leaving the parison suspended from the neck ring, as is well known. The slide is then moved inwardly to position the blow mold bottom 16 under the parison, and the blow mold is then closed.

The slide 17 is moved inwardly at station A, Figure 1, by an air cylinder 23, attached to a stationary table or arm 24. When the rotary mold table comes to a stop at station A, the slide 17 carrying the blow mold bottom is in its outward position, and the roller 22 on the lower side of the slide is aligned rearwardly of a lug 25 attached to guide rod 26 slidable in a guideway 27 provided in the top of the cylinder casing 23. The guide rod 26 is connected with the piston rod 28 of cylinder 23. The admission of air pressure to the forward end of the cylinder causes the lug 25 to move rearwardly, and as this lug is in engagement with the roller 22 the blow mold bottom slide 17 is moved inwardly to properly position the mold bottom beneath the glass parison suspended from the neck ring. The blow mold is then closed about the glass parison and the mold bottom. Such operation is old and well known.

Occasionally the blow mold bottom slide is not moved inwardly, or is not moved inwardly to the required extent, and in such cases very serious damage results from the continued operation of the machine. Failure to retract the slide may result from a broken piston rod on the cylinder 23, or the piston rod may become disconnected from its associated parts, or the timer controlling the operation of the cylinder may be set incorrectly, and from many other causes. If one or more of these slides are not retracted and the rotation of the mold table continues, the outwardly extending slide will strip and damage various parts such as air lines, electric conduits, etc., and also the blow mold and blow mold bottom may be damaged by the attempted automatic closing of the blow mold about the mold bottom, when the latter is not properly positioned.

In accordance with the present invention, if a blow mold bottom slide is not properly retracted at station A, the machine will be automatically stopped and the clutch thrown out, before any damage can be done. The preferred form of apparatus for thus preventing damage to the forming machine and associated parts, will now be described.

The mold table 1 rotates step by step in the direction of the arrow, Figure 1, and just beyond station A an electric switch, referred to generally by numeral 29, is attached to a stationary bracket 30. Of course the invention is not limited to any particular form of switch, but I have illustrated a rotary switch having a vertical shaft 31. When the machine is in normal operation the switch is closed, and when the shaft is rotated to open the switch, the motor 3 which drives the machine is stopped, and this rotation of the shaft also causes the clutch 5 to be thrown out.

The switch casing is lined with insulation 32, and the shaft 31 is also insulated within the switch casing, as indicated by numeral 33. The insulation 33 is pinned to the shaft 31 as shown in Figure 6, and may be provided with two flat faces 34. A spring finger 35 is adapted to cooperate with these flat faces of the insulation, to releasably hold the switch in its open or closed position.

Clamped to the upper end of the shaft 31 is an operating arm 36, provided with a roller 37 at its outer end. A spring finger 38 releasably clamps the arm in its normal position, i. e., the position in which the switch is closed. As the spring fingers 35 and 38 perform the same function, it is not essential that both fingers be provided.

If the blow mold bottom slides are properly retracted at station A, then the slides will pass freely by the arm 36. But if one of the slides is not retracted it will strike the arm 36 and move it to the left (Figure 1) to thereby open the switch.

Attached to the insulation 33 is a metal ring 39 carrying copper fingers 40 with the contact points 41 at the outer ends thereof. These points are brought into engagement with copper contacts 42 imbedded in insulation ring 43, when the switch is closed. Clamp fingers 44 are attached to the lower side of the insulation ring 43 and electrically connected with the contacts 42 by means of screws 45. Attached to the clamp fingers 44 are the conductors 46 of the switch circuit, which pass out from the switch casing through the opening 47.

These conductors lead to an electro-magnetic coil 48 associated with a switch 49 in the main power line 6. When the rotary switch is opened, a spring 50 opens the switch 49 to break the line 6 leading to the motor 3. The conductors 46 also lead, in the specific embodiment illustrated, to an "off and on" switch 51.

The shaft 31 of the rotary switch extends downwardly through the switch casing and the lower end thereof is operatively connected with the air valve 13, by any desired means. In the specific form illustrated, a coupling 52, which may be of insulation material, is pinned to the lower end of the switch shaft as indicated by numeral 52', and the lower end of the coupling engages over the operating knob 53 of the air valve. When the rotary switch is in its normal position, with the glass forming machine in normal operation, the air valve is in position to shut off communication between the source of compressed air and the rear end of the clutch operating cylinder 9; the rear end of the cylinder being in communication with the atmosphere through vent 14 in the air valve casing. When the switch is rotated, by reason of failure to properly retract one of the blow mold bottom slides, the air valve will be rotated to admit air pressure to the rear end of the clutch cylinder 9, whereupon the clutch is thrown out.

It is believed the operation of the invention will be understood from the foregoing description of the construction of the apparatus, and therefore only a very brief description of the operation will be given.

When the forming machine is operating normally, the blow mold bottom slide is retracted at station A, by the operation of cylinder 23, to align the blow mold bottom with the blow mold. If the slides are properly retracted at station A they will freely pass the operating arm 36 of the rotary switch 29. If for any reason one of the slides is not properly retracted at station A, no damage will result, for the projecting slide bottom will, upon the next step-by-step rotation of the mold table, strike the arm 36 and move it to the left (Figure 1), thereby operating the rotary switch.

This movement of the switch breaks the switch circuit 46, and upon breaking this circuit, the electromagnetic coil 48 releases the switch 49, in the main power circuit 6, and the spring 50 thereupon opens the switch and thus shuts down the motor 3 which drives the forming machine. The opening of the rotary switch also causes the "off and on" switch 51 to be moved to "off" position, in the present embodiment. But of course the invention is not limited to operation of the "off and on" switch, as the motor is shut down by the mere opening of the switch 49.

As a precaution, the main switch 7 may be pulled by hand, after the operation of the rotary switch has caused the automatic opening of switch 49.

The movement of the arm 36, by an extended blow mold bottom slide, not only shuts down the motor 3 as described above, but also causes the clutch 5 to be thrown out. The clutch is thrown out by the admission of air pressure through line 12 to the rear end of the cylinder 9. The air is admitted to the rear end of cylinder 9 when one of the slides strikes the arm 36, thereby rotating the switch shaft 31 and opening the valve 13 to which the shaft is operatively connected.

By shutting down the motor and throwing out the clutch, the forming machine is stopped, without any damage resulting from the failure of one of the mold bottom slides to be properly retracted.

The machine having been stopped, the necessary adjustment or repair is made to assure proper retraction of the slides, and the machine is then started up again. Of course the manner of starting up the machine may be varied as desired, but in the present embodiment of the invention, the rotary switch is first returned to its original position, thereby closing that switch and releasing the air pressure from the rear end of the clutch cylinder 9 through vent 14 in the air valve 13. The "off and on" switch 51 is then moved by hand to "on" position, so that the switch circuit 46 is closed and hence energizes the solenoid 48 to close the switch 49 in the main power line 6.

The clutch lever 8 is then thrown by hand to engage the clutch; the air pressure having been released from the rear end of the clutch cylinder 9 as already described. The main switch 7 is then closed manually, and the machine resumes operation.

In some installations, particularly those which operate at a very high speed, it is desirable to employ a brake which will be thrown into operation when the arm 36 is struck by a slide which is not properly retracted. Such an arrangement is illustrated in Figure 1. Numeral 54 indicates an ordinary brake drum with which the brake shoe 55 is adapted to cooperate. The brake is operated by air pressure admitted to the rear end of a brake cylinder 56 through pipe 12, and the brake is released by the springs 57, when the pressure is released from the cylinder.

Thus when the arm 36 is operated, the motor will be shut down, the clutch will be thrown out, and the brake will be applied. Of course the brake will be reset when the rotary switch is returned to its original position, thereby releasing the air pressure from the rear end of the brake cylinder 56 through vent 14 in the air valve 13.

While the particular apparatus disclosed herein has been described in some detail, yet it is obvious that many changes and modifications may be made without departing from the spirit of the invention, and all such changes and modifications are intended to be included within the scope of the appended claims.

What I claim is:

1. A glass forming machine including a rotary mold table, mold bottom slides mounted on the table, an electric switch, an air valve operatively connected with the switch, and means for operating the switch and valve when a mold bottom slide is not properly retracted.

2. A glass forming machine including a rotary mold table, mold bottom slides mounted on the table, an electric motor for driving the table, an electric switch for shutting down the motor when the switch is opened, and means for opening the switch when a mold bottom slide is not properly retracted.

3. A glass forming machine including a rotary mold table, mold bottom slides mounted on the table, an electric motor for driving the table, an electric switch for shutting down the motor when the switch is opened, and means for opening the switch, said means being in the path of an unretracted mold bottom slide.

4. A glass forming machine including a rotary mold table, mold bottom slides mounted on the table, an electric motor for driving the table, a rotary electric switch for shutting down the motor when the switch is opened, and means operated by the rotation of the mold table for rotating the switch to open position, when parts of the forming machine are in abnormal position.

5. A glass forming machine including a rotary mold table, mold bottom slides mounted on the table, an electric motor for driving the table, a rotary electric switch for shutting down the motor when the switch is opened, a shaft associated with the switch, and an arm extending from the shaft toward the mold table, said arm being in the path of an unretracted mold bottom slide.

6. A glass forming machine including a rotary mold table, mold bottom slides mounted on the table, an electric motor for driving the table, a clutch in the driving mechanism, a rotary electric switch for shutting down the motor when the switch is opened, a shaft associated with the switch, an air valve controlling the operation of said clutch, said switch and air valve being operatively connected, and means operated by the rotation of the mold table for rotating the switch to open position, when parts of the forming machine are in abnormal position.

7. A glass forming machine including a rotary mold table, mold bottom slides mounted on the table, driving mechanism for the table, a clutch in the driving mechanism, an air pressure operated cylinder for disengaging the clutch, a rotary valve for controlling the admission of air pressure to the cylinder, a shaft for rotating the valve to open position, and an arm extending from the shaft into the path of an unretracted mold bottom slide.

8. A glass forming machine including a rotary mold table, an electric motor for driving the mold table, a brake for preventing the rotation of the table, and means operated by movement of the mold table for shutting down the motor and applying the brake, when parts of the forming machine are in abnormal position.

9. A glass forming machine including a rotary table, an electric motor for driving the mold table, a clutch in the driving mechanism, a brake for preventing the rotation of the table, and means operated by movement of the mold table for shutting down the motor, disengaging the clutch and applying the brake, when parts of the forming machine are in abnormal position.

10. A glass forming machine including a rotary mold table, mold bottom slides on the table, driving mechanism for the table, a clutch in the driving mechanism, an air pressure operated cylinder for disengaging the clutch, a brake for preventing rotation of the table, an air pressure operated cylinder for applying the brake, a valve controlling the admission of air pressure to the said cylinders, and means for opening said valve, said means being in the path of an unretracted mold bottom slide.

CHARLES M. BIGGS.